United States Patent
Harada (10) Patent No.: US 9,370,848 B2
(45) Date of Patent: Jun. 21, 2016

(54) DEVICE FOR FASTENING SCREW ONTO WORKPIECE AND METHOD OF JUDGING LOOSENING OF SCREW

(75) Inventor: Toyoo Harada, Okazaki (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 441 days.

(21) Appl. No.: 13/609,687

(22) Filed: Sep. 11, 2012

(65) Prior Publication Data
US 2013/0067711 A1 Mar. 21, 2013

(30) Foreign Application Priority Data
Sep. 12, 2011 (JP) .................. 2011-198225

(51) Int. Cl.
B23P 19/06 (2006.01)
B25J 9/16 (2006.01)

(52) U.S. Cl.
CPC ............... *B23P 19/06* (2013.01); *B23P 19/066* (2013.01); *B25J 9/1679* (2013.01); *G05B 2219/45091* (2013.01); *Y10T 29/49764* (2015.01)

(58) Field of Classification Search
CPC ......... B23P 19/04; B23P 19/10; B29C 65/08; B21J 15/28; B23Q 17/20
USPC .............. 29/407.01, 407.05, 407.09, 407.1, 29/407.04, 525.01, 525.11; 81/430, 52, 81/57.37; 408/116, 16
See application file for complete search history.

(56) References Cited

U.S. PATENT DOCUMENTS

| | | | |
|---|---|---|---|
| 5,365,810 A * | 11/1994 | Inaniwa et al. | ......... 81/430 |
| 5,469,924 A | 11/1995 | Kanamori et al. | |
| 5,549,169 A | 8/1996 | Matsumura et al. | |
| 2011/0252927 A1 * | 10/2011 | Ota et al. | ......... 81/430 |

FOREIGN PATENT DOCUMENTS

| | | |
|---|---|---|
| DE | 3614007 A1 | 11/1987 |
| DE | 4400709 B4 | 6/2005 |
| JP | A-2004-338043 | 12/2004 |

OTHER PUBLICATIONS

Feb. 11, 2015 Office Action issued in German Patent Application No. 10 2012 108 476.9.

* cited by examiner

*Primary Examiner* — Ryan J Walters
(74) *Attorney, Agent, or Firm* — Oliff PLC (57) ABSTRACT

In judging loosening of a crew, a measuring section measures a position of a bit as a relative position in relation to a placement surface of a screw supplying device when the screw is acquired from the screw supplying device. The measuring section also measures the position of the bit as a relative position in relation to a workpiece surface when fastening of the screw onto a workpiece has been completed. A judging section judges that screw loosening has not occurred when, based on the first and second bit positions, a difference between the first and second bit positions falls within an allowable range. The judging section judges that screw loosening has occurred when the difference does not fall within the allowable range.

12 Claims, 8 Drawing Sheets (FIRST BIT POSITION)

(SECOND BIT POSITION)

DEVICE FOR FASTENING SCREW ONTO WORKPIECE AND METHOD OF JUDGING LOOSENING OF SCREW

CROSS-REFERENCE TO RELATED APPLICATION

This application is based on and claims the benefit of priority from earlier Japanese Patent Application No. 2011-198225 filed Sep. 12, 2011, the description of which is incorporated herein by reference.

BACKGROUND OF THE INVENTION

1. Field of the Invention

The present invention relates to a screw fastening device and a method of judging loosening of screws.

2. Description of the Related Art

A screw fastening device has been known since the past that acquires a screw from a screw supplying device and fastens the acquired screw onto a workpiece serving as a subject.

A screw fastening device such as this performs screw fastening torque control, detection of screw angle and screw lock, and the like when fastening a screw. Reduction in screw fastening failure is achieved through these control and detection operations. In addition, the screw fastening device judges whether or not the screw is tightly seated on the workpiece after fastening the screw, or in other words, whether or not the screw is loose (i.e., screw loosening). That is, the "screw loosening" means that the head (or neck) of a screw is not tightly seated on the placement surface of a workpiece and is located above the placement surface even when the screw fastening is completed. In contrast, the "screw lock" means that a screw is locked and cannot be screwed into the screw hole any more during its screw fastening operation due to irregularities in sizes of threads, oblique insertion of the screw into a screw hole, packed dusts, or others.

The screw loosening is judged based on various criteria, as described, for example, in JP-A-2004-338043. In JP-A-2004-338043, screw loosening is judged based on whether or not the height of a head section of the screw at completion of screw fastening is within a reference range set in advance, with reference to the height of the head section. In addition, screw loosening is judged based on whether or not the amount of movement of a bit from a position at which the screw and a screw hole mesh when the screw is fastened until the screw fastening is completed is within a reference range, with reference to the length of the shaft of the screw.

The screw is manufactured in adherence to standards, such as Japan Industrial Standards. However, the dimensions have allowable error. Therefore, in conventional judgment of screw loosening, the reference range takes into consideration standard values of the dimensions of specific areas of the screw and allowable error for the standard values.

However, when judgment of screw loosening is performed with reference to the height of the head section of the screw as described above, screw loosening may not be correctly judged. For example, when the reference range is set to a range including the maximum value of the allowable error of the head section, a smaller screw manufactured with the allowable error on the minus side may be judged not to be loose if the height is within the reference range, regardless of the screw actually being loose. In addition, when the reference range is set to a range smaller than the maximum value of the allowable error, a larger screw manufactured with the allowable error on the plus side may be judged to be loose because of the height exceeding the reference range, regardless of the screw not actually being loose. This problem may occur even when the dimension of another area, such as the length of the shaft section of the screw, serves as reference.

In other words, in the conventional judgment of screw loosening, the reference range is, by necessity, set to a range capable of absorbing the allowable error of the screw. Therefore, screw loosening that occurs within the range of allowable error is difficult to judge. In other words, in the conventional judgment of screw loosening, the reference range is limited by the allowable error of the screw. Therefore, improving judgment accuracy, or in other words, improving the rate of correct judgment to be a constant value or more is difficult. In addition, individual differences, such as in the shape of the screw hole, occur in the workpieces serving as the subject. Therefore, similar problems occur even when the reference range is set based on standard values of the dimensions of the workpiece.

Furthermore, another method is known regarding the above-described conventional reference range. Specifically, after the screw has been fastened, the size of the head section of the screw or the amount of movement of the bit during the fastening is measured. The reference range is set such that the occurrence rate of screw loosening is statistically less than an allowable value based on the measured data. Therefore, numerous data measurement operations are required to set the reference range. Work load and operation time for setting the reference range increase. Regardless of the increase in work load and operation time, improving the rate of correct judgment in the judgment of screw loosening is difficult, as described above.

SUMMARY

Thus it is desired to provide a screw fastening device and a screw loosening judging method capable of improving the rate of correct judgment in judgment of screw loosening, without causing increase in work load and operation time.

In a screw fastening device according to a first aspect, a bit position measuring section measures a position of a bit engaged with a screw as a relative position in relation to a placement surface on which the screw is placed in a screw supplying device at screw acquisition. Screw acquisition is when the screw is acquired in a state in which the bit driven by a bit driving section is engaged with the screw and the screw is pressed against the placement surface by the bit. The bit position measuring section also measures the position of the bit engaged with the screw as a relative position in relation to a workpiece surface provided with a screw hole at screw fastening completion. Screw fastening completion is when fastening of the screw onto a workpiece has been completed. At screw acquisition, the bit is driven towards the screw by the bit driving section. The bit is engaged with the screw while pressing against the screw. At this time, the screw is in close contact with the placement surface by the force applied by the bit, or in other words, seated on the placement surface. In other words, the first bit position measured at screw acquisition indicates a position of the bit in a state in which the screw is seated on the placement surface.

On the other hand, at screw fastening completion when fastening of the screw onto the workpiece has been completed, or more specifically, immediately after screw fastening has been completed, the screw is engaged with the bit. In addition, the screw is in close contact with the workpiece surface by being pressed by the bit, or in other words, seated on the workpiece surface. In addition, at screw fastening completion, the bit is engaged with the screw while pressing against the screw, in a manner similar to that at screw acquisition, described above. The bit position measuring section measures the position of the bit at screw fastening completion as a second bit position. In other words, the second bit position measured at screw fastening completion indicates a position of the bit in a state in which the screw is seated on the workpiece surface.

In other words, the bit and the screw are engaged while the head of the screw is being pressed against the placement surface at screw acquisition. As a result, the positional relationship between the screw and the bit when the placement surface serves as reference at screw acquisition and the positional relationship between the screw and the bit when the workpiece surface serves as reference at screw fastening completion can share a common aspect, or in other words, both can be a state in which the screw is seated on the placement surface or the workpiece surface. The position of the bit at screw acquisition is measured as the first bit position. Screw loosening is judged based on the first bit position and the second bit position measured at screw fastening completion. As a result, although the position of the bit at screw acquisition changes for each screw due to the allowable error of each screw, it can be taken into consideration that the first bit position has been measured for this screw to be judged for screw loosening. In this instance, the allowable error for each screw is reflected in the position of the bit at screw fastening completion, in a manner similar to that at screw acquisition. Therefore, even when the allowable error differs for each screw, erroneous judgment caused by judgment of screw loosening being affected by allowable error is considered not to occur. In addition, according to a configuration such as this, the dimensions of the workpiece are not required to be used for judgment of screw loosening. Therefore, judgment of screw loosening is not considered to be affected by individual differences in screw holes of the workpieces or the like.

Therefore, a screw loosening judging section judges screw loosening based on the first bit position and the second bit position. In other words, the screw loosening judging section judges screw loosening based on a bit position measured in a state in which the screw is seated before the screw is fastened and a bit position measured in a state in which the screw is seated after the screw has been fastened. At this time, as described above, the first bit position is measured separately for each screw. In addition, the screw of which the first bit position has been measured is directly fastened onto the workpiece. In other words, the first bit position and the second bit position serving as reference values for judging screw loosening are measured for each screw and each workpiece. As a result, judgment of screw loosening can be performed while absorbing allowable error of the screw and individual differences of the workpieces, without using the dimensions of specific areas of the screw as reference. Therefore, the reference values are not limited by the allowable error of the screw, the individual differences of the workpieces, and the like. The rate of correct judgment in judgment of screw loosening can be improved.

Furthermore, as described above, the first bit position and the second bit position are measured for each screw and each workpiece. Therefore, a common reference range taking into consideration the allowable error of the screw and the individual differences of workpieces is no longer required to be provided. In other words, the operation itself for data measurement for setting a common reference value is no longer required. Therefore, work load and operation time required for judgment of screw loosening can be reduced.

In a second aspect, there is provided a method of judging screw loosening of a screw acquired from a screw supplying device and screwed onto a workpiece. This method comprises steps of: first measuring, as a first bit position, a position of the bit which is relative to a placement surface of the screw supplying device in a screw acquisition state where the screw is acquired from the screw supplying device, the screw acquisition state being realized when a bit has been engaged with the screw and the bit presses the screw against the placement surface; storing information indicative of the first bit position; delivering the screw to the workpiece; fastening the delivered screw onto the workpiece; second measuring, as a second bit position, a position of the bit which is relative to a workpiece surface of the workpiece on which a screw hole is provided, in a screw fastening completion state where fastening of the screw onto the workpiece has been completed and the bit is engaged with the screw; and judging that screw loosening has not occurred when, based on the first bit position and a second bit position, a difference between the first bit position and the second bit position falls within an allowable range set in advance, and judging that the screw loosening has occurred when the difference between the first bit position and the second bit position is outside the allowable range.

As a result, similar or equivalent operations and advantages to those obtained according to the first aspect can also be obtained.

DETAILED DESCRIPTION OF THE PREFERRED EMBODIMENTS

An embodiment of a screw fastening device and a screw loosening judging method will hereinafter be described with reference to FIG. 1 to FIG. 8A-FIG. 8D.

Figure 1:
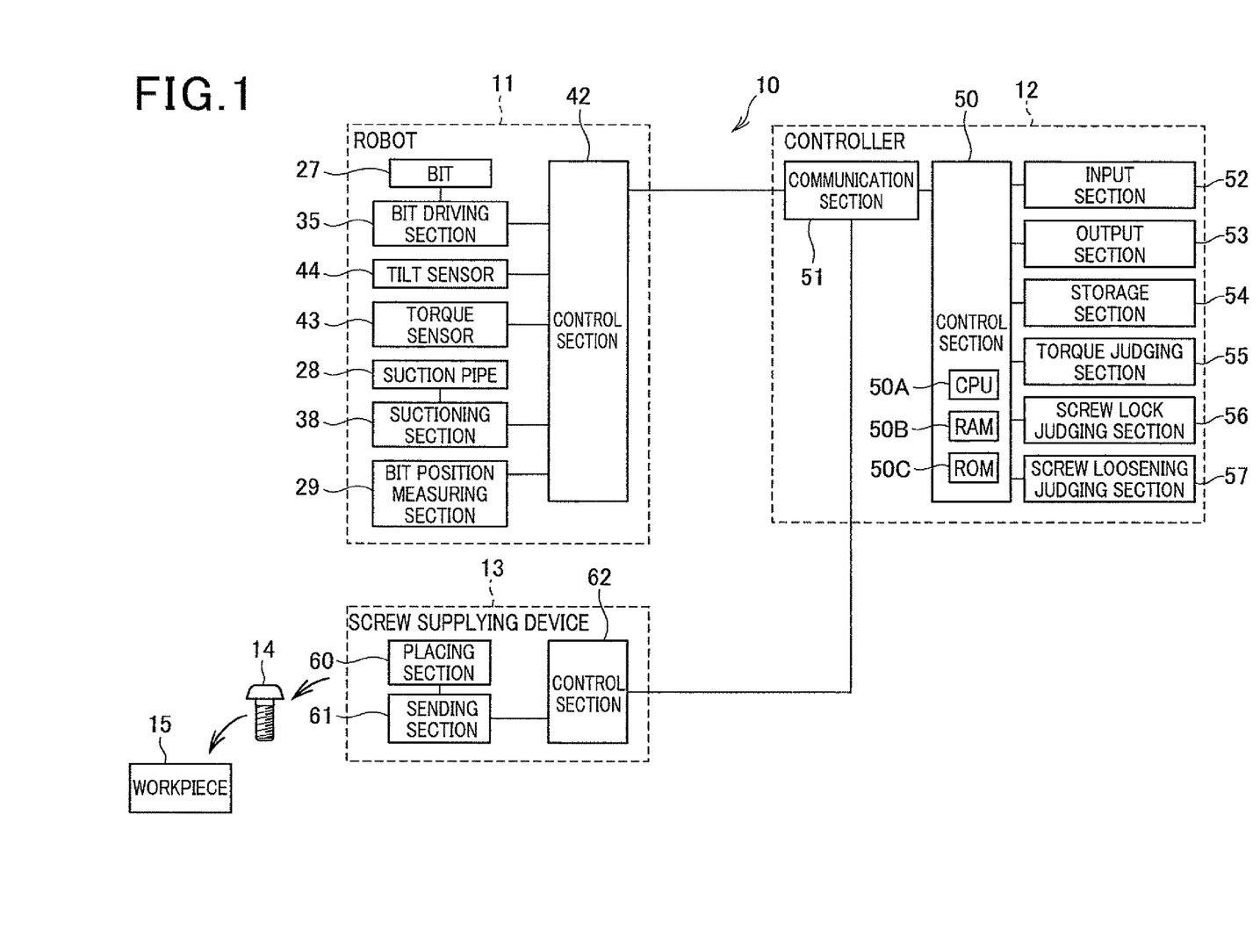
FIG. 1 is a schematic diagram of a configuration of a screw fastening device according to an embodiment.

A screw fastening device 10 according to the present embodiment includes a robot 11 and a controller 12, as shown in FIG. 1, The screw fastening device 10 acquires a screw 14 supplied from a screw supplying device 13. The screw fastening device 10 then fastens the acquired screw 14 onto a workpiece 15 serving as a subject.

Figure 2:
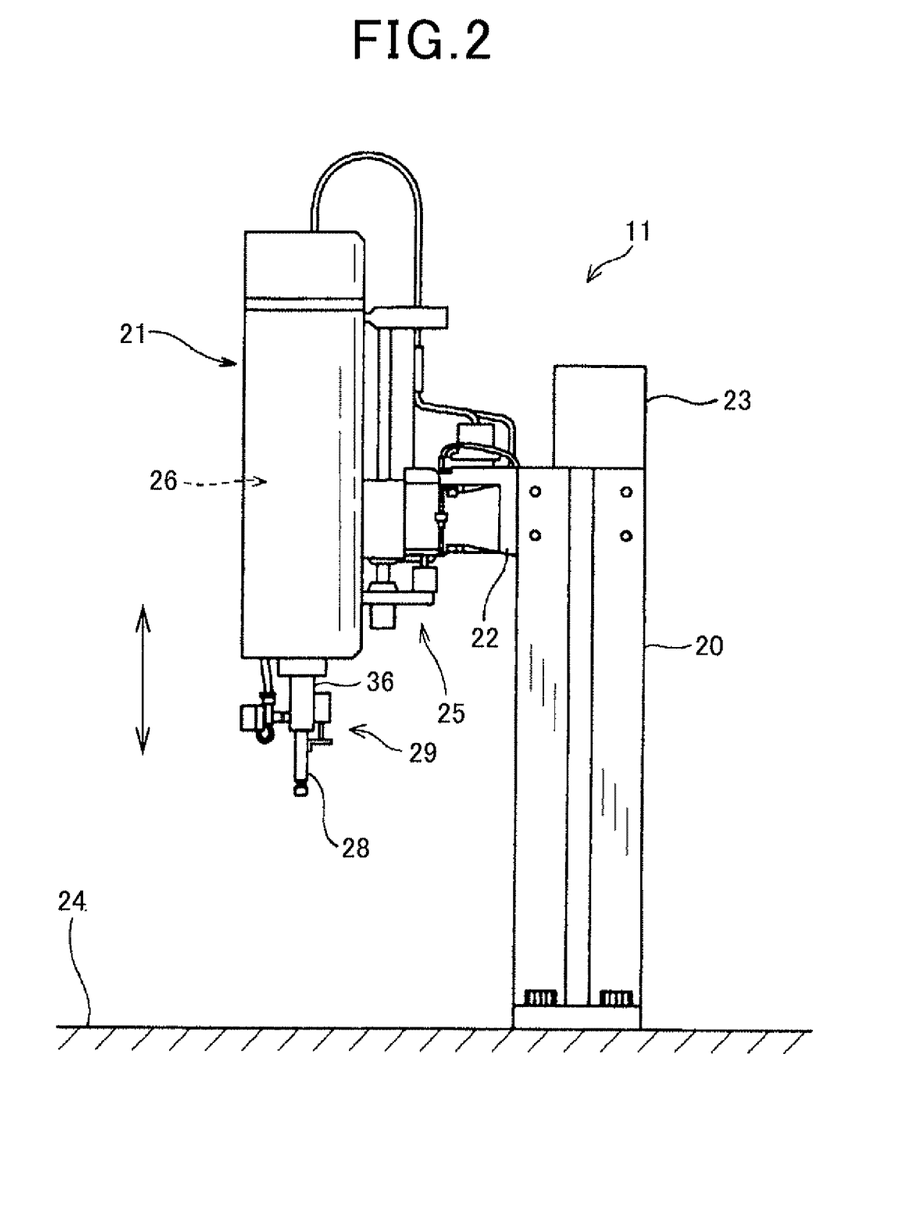
FIG. 2 is a schematic diagram of an outer appearance of a robot of the screw fastening device.
Figure 3:
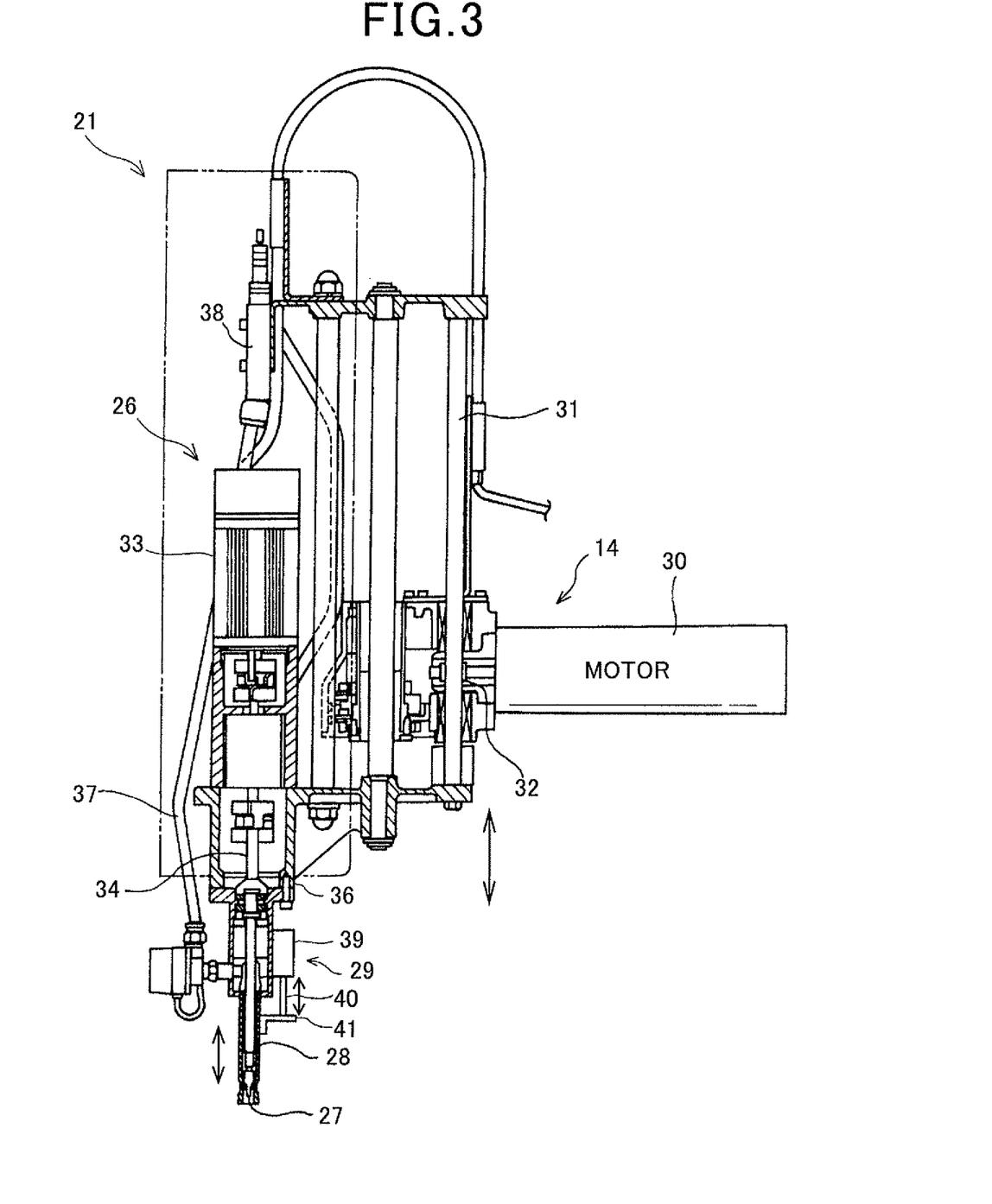
FIG. 3 is a partially enlarged partial cross-sectional view of the robot of the screw fastening device.

The robot 11 of the screw fastening device 10 includes a base section 20, a head section 21, an arm section 22, and a connector box 23, as shown in FIG. 2 and FIG. 3. The base section 20 is fixed to a mounting surface 24 on which the robot 11 is mounted. The head section 21 is connected to the base section 20 by the arm section 22. The arm section 22 is attached to an upper end side of the base section 20. The head section 21 is provided such as to be rotatable in relation to the base section 20. More specifically, the head section 21 is provided such as to be movable between a screw acquisition position and a fastening position. The screw acquisition position is where the screw 14 is acquired from the screw supplying device 13. The fastening position is where the screw 14 is fastened onto the workpiece 15. The robot 11 may be an articulated robot including a plurality of joints, such as a so-called six-axis robot.

In addition, the head section 21 includes a linear drive mechanism section 25, a rotation drive mechanism section 26, a bit 27, a suction pipe 28, and a bit position measuring section 29. The linear drive mechanism section 25 linearly drives the head section 21 in a reciprocating manner in relation to the arm section 22. In the instance shown in FIG. 2, the linear drive mechanism section 25 linearly drives the head section 21 in a reciprocating manner in the up/down direction in FIG. 2. In the subject application, the movement direction of the head section 21 is hereinafter described as the up/down direction. The linear drive mechanism section 25 includes, for example, a motor 30 serving as a power source, a rack 31, and a pinion 32, as shown in FIG. 3. As a result of these components, the head section 21 moves in the up/down direction in FIG. 2 when the motor 30 is energized. At this time, the bit 27 provided in the head section 21 also moves integrally with the head section 21 in the up/down direction, in accompaniment with the movement of the head section 21 in the up/down direction.

The rotation drive mechanism section 26 includes a motor 33 and a shaft 34, as shown in FIG. 3. A rotation shaft of the motor 33 is connected to the shaft 34. The motor 33 rotatably drives the shaft 34. The shaft 34 is connected to the bit 27 on the end section opposite to the motor 33, as shown in FIG. 2 and FIG. 3. As a result, the bit 27 is rotatably driven by the shaft 34 of the rotation drive mechanism section 26. A bit driving section 35 shown in FIG. 1 is configured by the linear drive mechanism section 25 and the rotation drive mechanism section 26.

The tip of the bit 27 on the side opposite to the shaft 34 (the lower end in FIG. 3) engages with the screw 14. The bit 27 rotates the screw 14. Specifically, when the screw 14 is acquired from the screw supplying device 13 and when the screw 14 is fastened onto workpiece 15, the bit 27 engages with the screw 14 by being moved downward by the linear drive mechanism section 25. The bit 27 then rotates the screw 14 by being rotated by the rotation drive mechanism section 26. The bit 27 is housed within a holder section 36. The holder section 36 is integrally connected to the head section 21. The holder section 36 moves in the up/down direction with the head section 21. Therefore, the holder section 36 also moves integrally with the bit 27 in the up/down direction. Thus, even when the bit section 27 moves in the up/down direction, the relative position between the holder section 36 and the bit 27, or more specifically, the relative position between the holder section 36 and the bit 27 in relation to the up/down direction does not change.

The suction pipe 28 is formed into a circular cylindrical shape that extends in the up/down direction on the outer peripheral side of the bit 27, as shown in FIG. 3. The bit 27 is housed on the inner peripheral side of the suction pipe 28. The suction pipe 28 is formed by a metal material, such as stainless steel. The suction pipe 28 has rigidity. The suction pipe 28 is open on the tip side of the bit 27. The opposite end section of the suction pipe 28 is connected to a suctioning section 37 with a pipe 38 therebetween. The suctioning section 37 decompresses the interior of the suction pipe 28 via the pipe 38. As a result, the screw 14 is suctioned to the tip of the suction pipe 28 and held by the suction pipe 28.

In addition, the suction pipe 28 moves in the up/down direction with the movement of the head section 21 in the up/down direction. The suction pipe 28 is also provided such as to be capable of relative movement in the up/down direction in relation to the holder section 36 and the bit 27. An aspect of the relative movement of the suction pipe 28 in relation to the bit 27, and an aspect of the above-described engagement between the bit 27 and the screw 14 will be described in detail with reference to FIG. 7 and FIG. 8, described hereafter.

The bit position measuring section 29 measures the relative position between the bit 27 and the suction pipe 28. The bit position measuring section 29 includes a sensor main body 39, a probe 40, and a flange section 41. The sensor main body 39 is fixed to the holder section 36. The probe 40 extends downward from the sensor main body 39. The flange section 41 is fixed to the suction pipe 28. The sensor main body 39 moves in the up/down direction in accompaniment with the movement of the head section 21 in the up/down direction. In other words, the sensor main body 39 moves in the up/down direction while maintaining the relative positional relationship in the up/down direction with the bit 27.

The probe 40 is connected to the sensor main body 39 on the upper end section side in FIG. 3. The lower end section in FIG. 3 is in contact with the top surface of the flange section 41. The probe 40 is connected such as to be movable in relation to the sensor main body 39. The probe 40 is urged downward in FIG. 3 by an urging means (not shown) of the sensor main body 39. Therefore, when the suction pipe 28 relatively moves upwards in relation to the holder section 36, the probe 40 is pressed upwards by the flange section 41. On the other hand, when the suction pipe 28 relatively moves downwards in relation to the holder section 36, the probe 40 is pressed downward by the urging means (not shown). Therefore, the lower end section in FIG. 3 of the probe 40 is in contact at all times with the top surface of the flange section 41. As a result, the sensor main body 39 measures the position of the probe 40, thereby measuring the relative position of the suction pipe 28 in relation to the holder section 36, or in other words, the relative position of the suction pipe 28 in relation to the bit 27.

In addition, the robot 11 includes a control section 42, as shown in FIG. 1. The control section 42 is configured by a computer including a central processing unit (CPU), a random access memory (RAM), a read-only memory (ROM), and the like (not shown). The control section 42 controls the overall robot 11. In addition, the control section 42 is connected to the bit driving section 35, the suctioning section 37, and the bit position measuring section 29, described above. The control section 42 is also connected to known sensor means used when fastening of the screw 14 is automated. The known sensor means include a torque sensor 43, a tilt sensor 44, and the like. The torque sensor 43 detects torque applied to the bit 27 that is rotatably driven by the rotation drive mechanism section 25. The tilt sensor 44 detects the tilt of the screw 14.

The robot 11 fastens the screw 14 onto the workpiece 15 based on a command from the controller 12. The controller 12 includes a control section 50, a communication section 51, an input section 52, an output section 53, a storage section 54, a torque judging section 55, a screw lock judging section 56, a screw loosening judging section 57, and the like. The control section 50 is configured by a computer including a CPU 50A, a RAM 50B, and a ROM 50C. The control section 50 controls the overall controller 12 by running a computer program. The communication section 51 performs transmission and reception of various pieces of information and data between the controller 12 and the robot 11, and between the controller 12 and the screw supplying device 13. The input section 52 is configured by, for example, various switches or a keyboard. Various operations and instructions by an operator are inputted into the input section 52. The output section 53 is configured by, for example, a display lamp or a relay. The output section 53 outputs various pieces of information, warnings, and the like. The storage section 54 is configured by a storage medium, such as a hard disk drive (HDD) or an electrically erasable programmable read-only memory (EEPROM). The storage section 54 stores therein various pieces of information including a first bit position, described hereafter. The storage section 54 is equivalent to a bit position storage section.

The control section 50 is connected to the torque judging section 55, the screw lock judging section 56, and the screw loosening judging section 57. The torque judging section 55 and the screw lock judging section 56 judges the fastening state of the screw 14 based on various pieces of information transmitted from the robot 11 side, as is already known. The various pieces of information include, for example, torque detected by the torque sensor 43, and the tilt of the screw 14 detected by the tilt sensor 44 or the like. The screw loosening judging section 57 judges whether or not screw loosening has occurred in the screw 14 fastened onto the workpiece 15. The screw loosening judging section 57 will be described in detail hereafter. According to the present embodiment, the torque judging section 55, the screw lock judging section 56, and the screw loosening judging section 57 are actualized as software by a computer program run by the control section 50.

Incidentally the above judging sections 55, 56, and 57 may be functionally realized by another computer which is different from the computer that composes the control section 50. Alternatively those judging sections 55, 56, and 57 may be realized by using electronic circuits including logic circuits.

Figure 4:
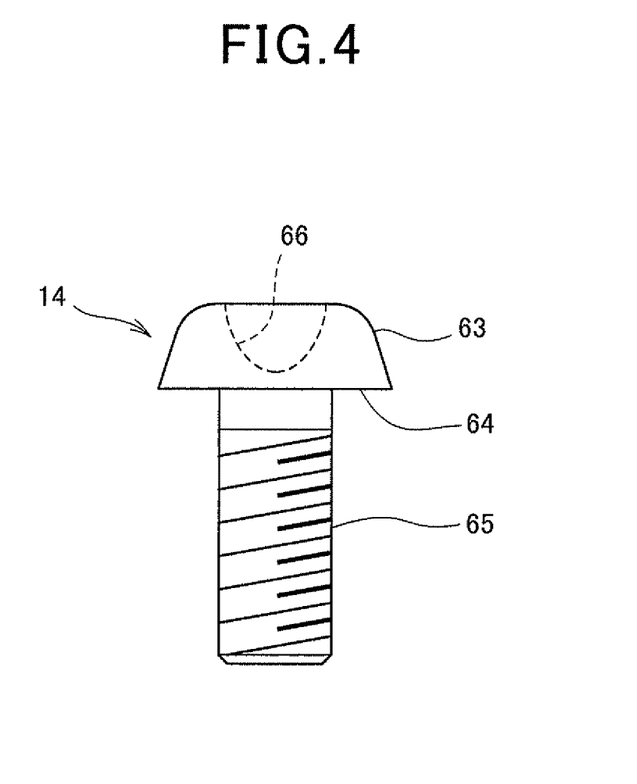
FIG. 4 is a schematic diagram of an outer appearance of a screw.

The screw supplying device 13 includes a placing section 60, a sending section 61, and a control section 62. The control section 62 controls the placing section 60 and the sending section 61. The screw supplying device 13 supplies the screw fastening device 10 with the screw 14. The screw supplying device 13 itself has a known configuration. Therefore, a detailed description thereof is omitted. The screw 14 supplied by the screw supplying device 13 includes a head section 63, a neck section 64, and a shaft section 65, as shown in FIG. 4. The head section 63 is provided with an engaging recess section 66 that engages with the tip of the bit 27. The engaging recess section 66 is formed into a cross-shaped groove section when the screw is, for example, a so-called Phillips head screw. When the head section 63 is rotated, the screw 14 advances in the axial direction (the longitudinal direction) of the shaft section 65.

Figure 5A:
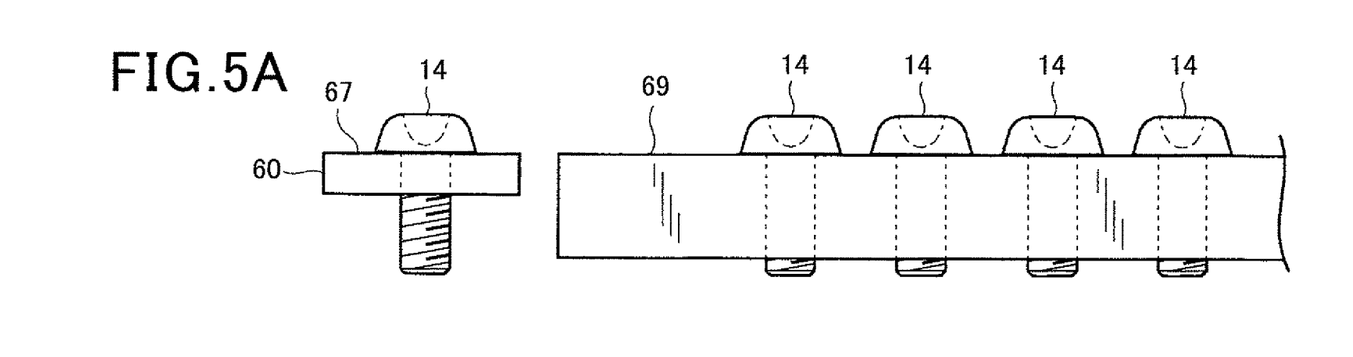
FIG. 5A and FIG. 5B are schematic diagrams of an aspect in which a screw is supplied by a screw supplying device.
Figure 5B:
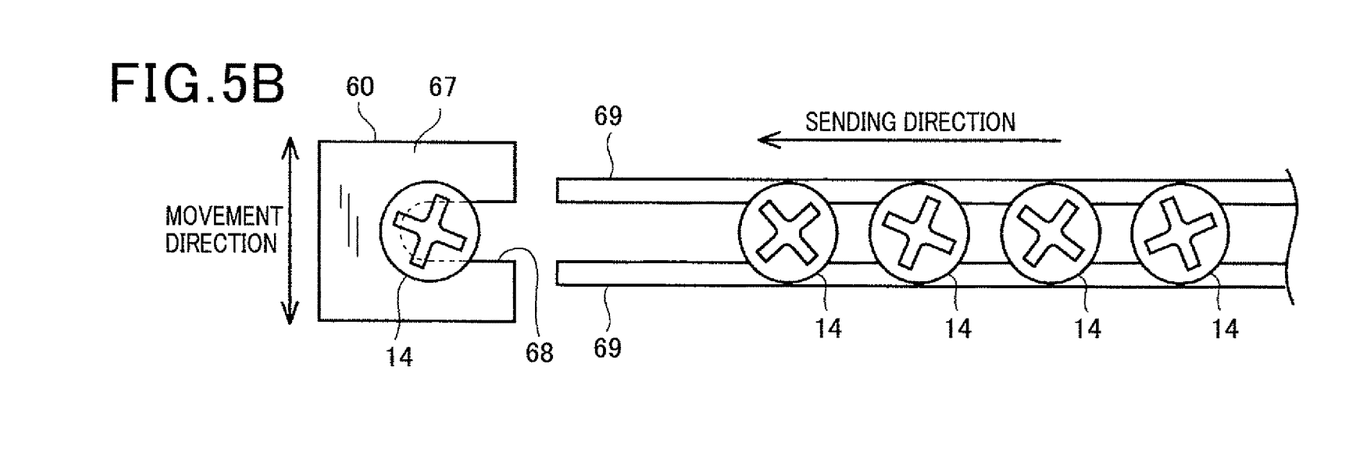

The placing section 60 of the screw supplying device 13 has a placement surface 67 and a recess section 68, as shown in FIG. 5A and FIG. 5B. The screw 14 is placed on the placement surface 67. The recess section 68 receives the screw 14. When the screw 14 is placed on the placement surface 67, the placing section 60 moves in a movement direction indicated by an arrow in FIG. 5B. The sending section 61 has a screw sending mechanism section (not shown). The sending section 61 sends the screw 14 in a sending direction indicated in FIG. 5B from between rails 69. As a result, a single screw 14 is placed in the placing section 60. The position of the movement destination to which the placing section 60 moves in a state in which the single screw 14 is placed thereon corresponds with the screw acquisition position. The screw acquisition position is where the screw fastening device 10 acquires the screw 14, as described above. The screw supplying device 13 also includes various known means, such as an inspecting means and a placement detecting means (not shown). The inspecting means is for detecting the presence of defective screws 14 sent by the sending section 61. The placement detecting means is for detecting placement of the screw 14 on the placing section 60.

Figure 6:
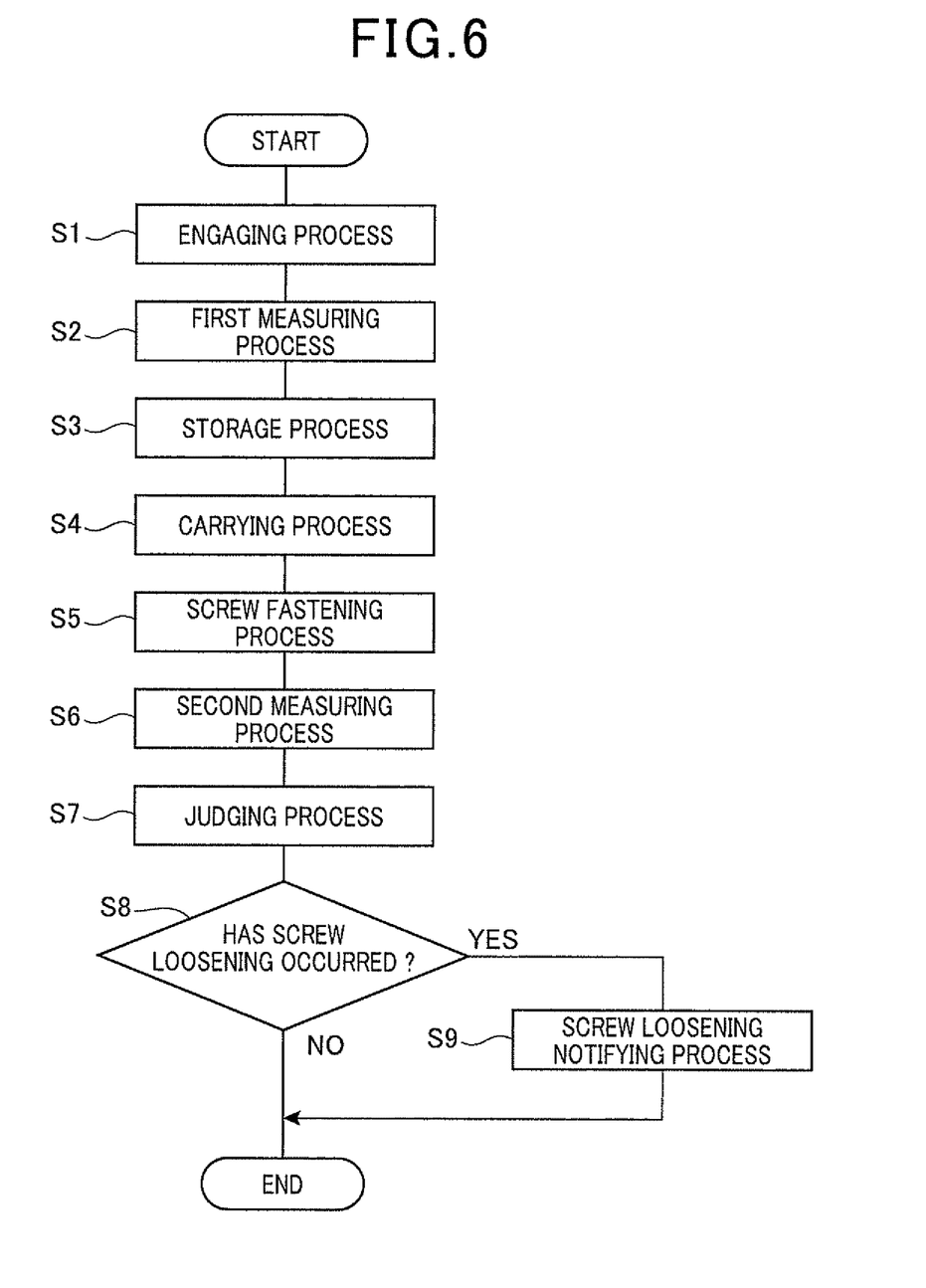
FIG. 6 is a flowchart of a screw fastening process.

Next, operations of the screw fastening device 10 configured as described above will be described with the flow of a fastening process of the screw 14 shown in FIG. 6. Each process described hereafter is performed by the control section 42 of the robot 11 or the control section 50 of the controller 12. However, to simplify the description, the whole of the screw fastening device 10 is given as the main component which is in charge of performing the control.

When acquiring the screw 14 from the screw supplying device 13, the screw fastening device 10 first engages the bit 27 with the screw 14 (S1: engaging process). In the engaging process, the bit 27 and the screw 14 are engaged as shown in FIG. 7A to FIG. 7D. In FIG. 7A to FIG. 7D, the main sections of the bit 27, the suction pipe 28, and the bit position measuring section 29 are shown. FIG. 7A to FIG. 7D schematically show that the bit 27 and the bit position measuring section 29 integrally move by both components being connected by broken lines.

Figure 7A:
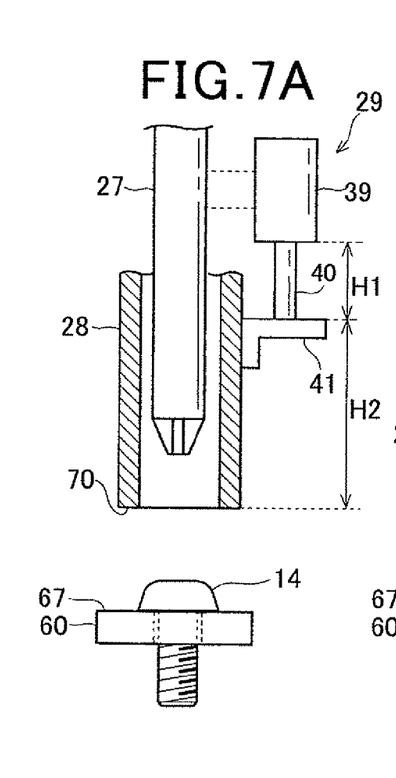
FIG. 7A to FIG. 7D are schematic diagrams of a positional relationship between a bit and a placement surface when a screw is acquired.

In the screw acquisition position shown in FIG. 7A, a distance between the sensor main body 39 of the bit position measuring section 29 and the top surface of the flange section 41, or in other words, the relative position of the bit 27 in relation to the suction pipe 28 is H1. The distance between the top surface of the flange section 41 and the end surface 70 on the lower end side of the suction pipe 28 is H2. The end surface 70 on the lower end side of the suction pipe 28 is equivalent to a suction side end surface.

Figures 7B, 7C:
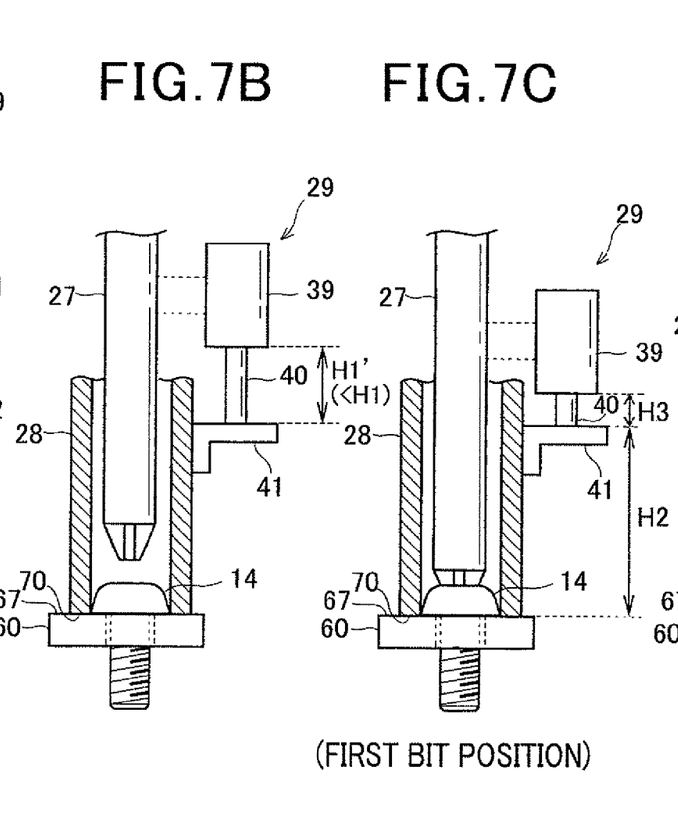

The screw fastening device 10 linearly drives the head section 21 downward by the linear drive mechanism section 25. At this time, the bit 27 also moves downward. On the other hand, the end surface 70 on the lower end side of the suction pipe 28 comes into contact with the placement surface 67 as shown in FIG. 7B. When the bit 27 moves further downward in this state, the relative position between the suction pipe 28 and the bit 27 changes in accompaniment with the movement of the head section 21. Specifically, the end surface 70 on the lower end side of the suction pipe 28 is in contact with the placement surface 67. Therefore, the upper end section side (not shown) of the suction pipe 28 advances towards the interior of the holder 36. The flange section 41 is integrally provided with the suction pipe 28. Therefore, at this time, the flange section 41 presses the probe 40 of the bit position measuring section 29 upward. As a result, the distance H1' (<H1) between the sensor main body 39 and the top surface of the flange section 41 gradually decreases in accompaniment with the downward movement of the head section 21.

In other words, during the period from the state in FIG. 7B to the state in FIG. 7C, the relative position between the bit 27 and the suction pipe 28, or more specifically, the relative position between the tip of the bit 27 and the end surface 70 of the suction pipe 28 changes. The bit 27 ultimately engages with the screw 14, as shown in FIG. 7C. At this time, the distance between the sensor main body 39 and the top surface of the flange section 41 measured by the bit position measuring section 29, or in other words, the relative position of the bit 27 in relation to the suction pipe 28 is H3. The suction pipe 28 has rigidity, as described above. Therefore, the distance between the top surface of the flange section 41 and the end surface 70 of the suction pipe 28 does not change and remains H2.

The engaging recess section 66 of the screw 14 is formed, for example, into a cross-shaped groove as shown in FIG. 5B.

Therefore, the tip of the bit 27 may not correctly engage with the engaging recess section 66 simply by the bit 27 being moved downward. Thus, when acquiring the screw 14, the screw fastening device 10 moves the bit 27 downward while rotating the bit 27 by the rotation drive mechanism section 26. In addition, to ensure that the bit 27 engages with the screw 14, the screw fastening device 10 outputs a command signal to the linear drive mechanism section 25 with a position at which the tip of the bit 27 projects further than the end surface 70 of the suction pipe 28 that is in contact with the placement surface 67 as a target position. Therefore, when acquiring the screw 14, the bit 27 engages with the screw 14 while pressing the screw 14 from above. When the bit 27 engages with the screw 14, the bit 27 does not move any further downward. Therefore, the bit 27 does not actually project further than the suction pipe 28.

In other words, the state in which the bit 27 and the screw 14 are engaged, shown in FIG. 7C, is a state in which the bit 27 is pressing the screw 14 from above. Therefore, the screw 14 in this state is in a state in which the neck section 64 is in close contact with the placement surface 67 by the force applied by the bit 27. In other words, the neck section 64 is seated on the placement surface 67. The state shown in FIG. 7C is equivalent to "at screw acquisition". At this time, the placement surface 67 serves as a reference surface for measuring the relative position of the bit 27 at screw acquisition.

Then, the screw fastening device 10 measures the position of the bit 27 at screw acquisition (S2: first measuring process). As described above, at screw acquisition, the end surface 70 on the lower end side of the suction pipe 28 is in contact with the placement surface 67. In addition, the distance between the top surface of the flange section 41 and the end surface 70 of the suction pipe 28 is H2 and is a constant distance. Therefore, the distance from the sensor main body 39 to the placement surface 67 at screw acquisition is H2+H3. Therefore, as a result of the relative position (H3) of the bit 27 in relation to the suction pipe 28 being measured, the position of the bit 27 at screw acquisition, or in other words, the relative position of the bit 27 in relation to the placement surface 67 can be measured. The position of the bit 27 measured at Step S2 is equivalent to a first bit position.

Figure 7D:
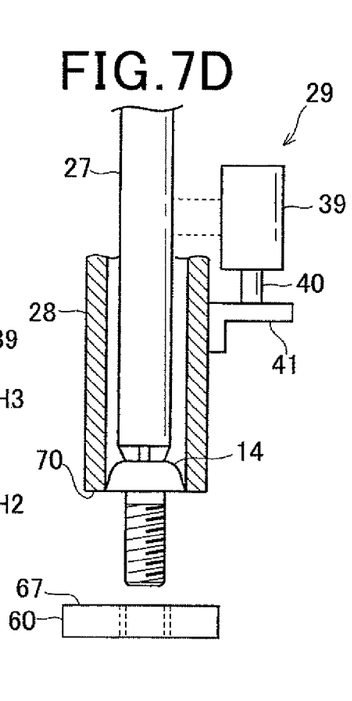

Next, the screw fastening device 10 temporarily stores information indicative of the measured first bit position in the storage section 54 (S3: storage process). As a result, the position of the bit 27 in a state in which the screw 14 is seated at screw acquisition is stored in the storage section 54. In other words, the screw fastening device 10 measures the position of the bit 27 in the state in which the screw 14 is seated, before fastening the screw 14 onto the workpiece 15. When the first bit position is stored, the screw fastening device 10 moves the head section 21 upwards as shown in FIG. 7D. At this time, the suctioning section 37 is driven. As a result, the screw 14 is suctioned by the suction pipe 28. In other words, the screw 14 is held by the suction pipe 28. The suctioning section 37 may be driven at any time as long as it is after the suction pipe 28 coming into contact with the placement surface 67.

In the state in which the screw 14 is held, and the bit 27 and the screw 14 are engaged in this way, the screw fastening device 10 acquires the screw 14 from the screw supplying device 13.

Figure 8A:
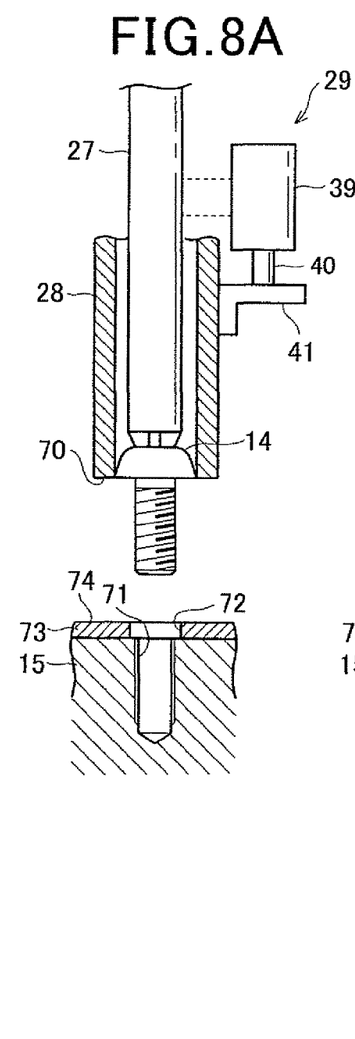
FIG. 8A to FIG. 8D are schematic diagrams of a positional relationship between the bit and a workpiece surface when a screw is fastened.

When the screw 14 is acquired, the screw fastening device 10 carries the acquired screw 14 to the upper side of the workpiece 15 as shown in FIG. 8A (S4: carrying process). The position indicated by, for example, FIG. 8A corresponds with the fastening position. The fastening position is where the screw fastening device 10 fastens the screw 14 onto the workpiece 15, as described above.

Figures 8B, 8C:
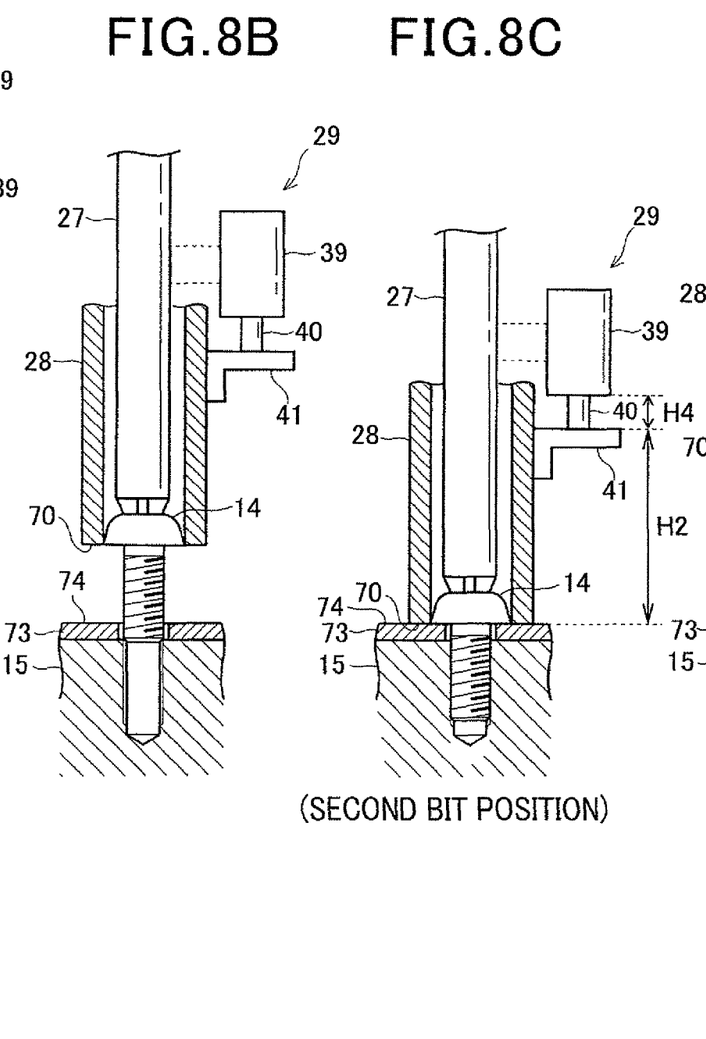
Figure 8D:
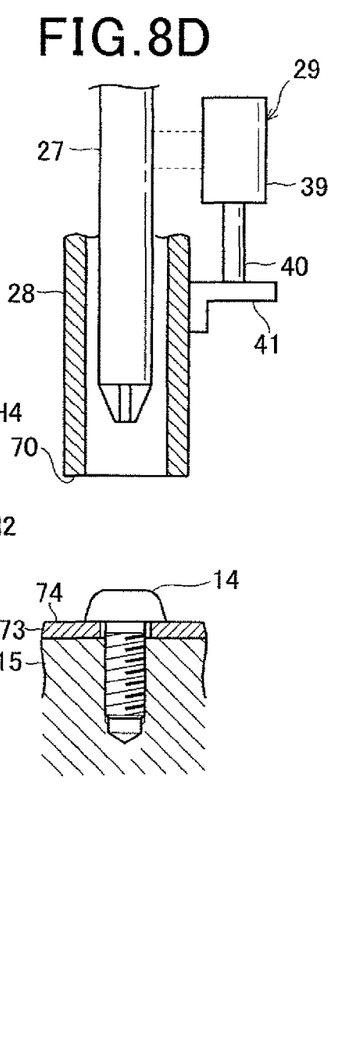

Then, after moving the head 12 downward as shown in FIG. 8B, the screw fastening device 10 fastens the workpiece 15 and a workpiece 73 by the screw 14 (S5: screw fastening process). The workpiece 15 is provided with a screw hole 71. The workpiece 73 is provided with a screw through hole 72. At this time, the screw fastening device 10 judges whether or not fastening of the screw 14 has been completed by the torque judging section 55 judging the screw fastening torque. The screw fastening device 10 also performs known inspection operations, such as judgment of whether or not the screw 14 is tilted based on a detection value from the tilt sensor 44, and judgment of whether or not screw lock has occurred by the screw lock judging section 56.

Then, when judged that fastening of the screw 14 has been completed as shown in FIG. 8C, the screw fastening device 10 measures the position of the bit 27 at this time (S6: second measuring process). In other words, the state shown in FIG. 8C is a state in which fastening of the screw 14 has been completed, or more specifically, a state immediately after fastening of the screw 14 has been completed. This state is equivalent to "at screw fastening completion". In addition, the position of the bit 27 measured at screw fastening completion is equivalent to a second bit position. In the instance shown in FIG. 8C, the screw fastening device 10 measures the relative position (H4) of the bit 27 in relation to the suction pipe 28 at screw fastening completion. As a result, the screw fastening device 10 measures the relative position of the bit 27 in relation to a workpiece surface 74 as the second bit position. Here, the workpiece surface 74 according to the present embodiment is a surface (the top surface in FIG. 8C) of the workpiece 73. In other words, when the workpiece 15 and the workpiece 73 are fastened by a screw as according to the present embodiment, the workpiece surface 74 indicates a surface of the overall workpiece including both workpiece 15 and workpiece 73 with which the end surface 70 of the suction pie 28 comes into contact. The workpiece surface 74 serves as a reference surface for measuring the relative position of the bit 27 at screw fastening completion.

At screw fastening completion such as that shown in FIG. 8C, the screw 14 is engaged with the bit 27. In addition, the screw 14 is pressed from above by the bit 27. Therefore, when the screw 14 at screw fastening completion is correctly fastened, the screw 14 is in close contact with the workpiece surface 74, or in other words, seated on the workpiece surface 74. In other words, the state of the screw 14 at screw fastening completion shown in FIG. 8C is considered to be a replication of the state of the screw 14 at screw acquisition shown in FIG. 7C.

Then, the screw fastening device 10 judges whether or not screw loosening has occurred based on the first bit position measured at screw acquisition and the second bit position measured at screw fastening completion (S7: judging process). In this instance, the screw fastening device 10 judges that screw loosening has not occurred (the screw is not loose) when the screw loosening judging section 57 judges that the difference between the first bit position and the second bit position falls within an allowable range set in advance. On the other hand, when judged that the difference between the first bit position and the second bit position does not fall within the allowable range, the screw fastening device 10 judges that screw loosening has occurred (the screw is loose).

Incidentally the loosening of a screw can take a positive value or a negative value. When the neck 64 of the screw 14 is higher than the surface of a workpiece when the screw fastening is completed, the amount of the screw loosening is positive. By contrast, a screw hole is located in a locally recessed area of a workpiece, the neck 64 may be lower than the surface of the workpiece. In such a case, the amount of screw loosening is detected as a negative value. Hence, the screw loosening may be determined on the basis of the absolute values of measured height positions.

Here, the allowable range set in advance is a setting value for judging the difference between the first bit position and the second bit position. The first bit position is the position of the bit 27 at screw acquisition. The second bit position is the position of the bit 27 at screw fastening completion. In other words, the allowable range is a setting value for judging whether or not the seated state of the screw 14 at screw acquisition shown in FIG. 7C is replicated at screw fastening completion shown in FIG. 8C. The allowable range is not for judging the dimension of a specific area of the screw 14 or the dimension of the workpiece 15 after the screw 14 has been fastened. Therefore, the allowable range can be set regardless of the dimensions of the screw 14 and the workpiece 15. In other words, the screw fastening device 10 and the screw loosening judging method according to the present embodiment judges whether or not screw loosening has occurred without depending on the dimensions of specific areas of the screw 14 and the like that have allowable error.

Next, when judged that screw loosening has not occurred based on the judgment result by the screw loosening judging section 57 (S8: NO), the screw fastening device 10 ends processing. On the other hand, when judged that screw loosening has occurred (S8: YES), the screw fastening device 10 gives notification that screw loosening has occurred to, for example, the operator or another control device (not shown) (S9: screw loosening notifying process).

In this way, in the series of processes for fastening the screw 14, the screw fastening device 10 performs acquisition of the screw 14, fastening of the screw 14, and judgment of screw loosening with focus placed on the state in which the screw 14 is seated occurring before and after the screw 14 is fastened. Subsequently, the screw fastening device 10 repeats the processes at Step S1 to Step S9, described above, for each screw 14 supplied by the screw supplying device 13.

According to the screw fastening device 10 and the screw loosening judging method described above, the following effects can be achieved.

At screw acquisition, the bit 27 is driven towards the screw 14 by the bit driving section 35. The bit 27 engages with the screw 14 while pressing against the screw 14. Therefore, the screw 14 at screw acquisition is kept in close contact with the placement surface 67 by the force applied by the bit 27. In other words, the screw 14 is seated on the placement surface 67. In addition, the screw 14 is seated on the workpiece surface 74 at screw fastening completion as well, in a manner similar to that at screw acquisition. In other words, the state in which the screw 14 is seated on the placement surface 67 occurs when the screw 14 is acquired. The screw fastening device 10 measures the first bit position that is the relative position of the bit 27 in relation to the placement surface 67 at screw acquisition. The screw fastening device 10 measures the second bit position that is the relative position of the bit 27 in relation to the workpiece surface 74 at screw fastening completion. The screw fastening device 10 judges screw loosening based on the first bit position and the second bit position. At this time, the first bit position is measured separately for each screw 14. In addition, the screw 14 of which the first bit position has been measured is directly fastened onto the workpiece 15. Therefore, the first bit position and the second bit position serving as reference values for judging screw loosening are measured for each screw 14 and each workpiece 15. As a result, judgment of screw loosening can be performed while absorbing allowable error of the screw 14 and individual differences of the workpieces 15, without using the dimensions of specific areas of the screw 14 as reference. Therefore, the reference values are not limited by the allowable error of the screw 14, the individual differences of the workpieces 15, and the like. The rate of correct judgment in judgment of screw loosening can be improved.

The screw fastening device 10 measures the first bit position and the second bit position for each screw 14 and each workpiece 15. Therefore, a common reference value taking into consideration the allowable error of the screw 14 and the individual differences of the workpieces 15 is not required to be provided. In other words, the operation itself for data measurement for setting a common reference value is no longer required. Therefore, work load and operation time required for judging screw loosening can be reduced.

The screw fastening device 10 measures the position of the bit 27 as the relative position between the suction pipe 28 and the bit 27. The end surface 70 on the lower end side of the suction pipe 28 comes into contact with the placement surface 67 at screw acquisition. In addition, the end surface 70 comes into contact with the workpiece surface 74 at screw fastening completion. Therefore, as a result of the relative position of the bit 27 in relation to the suction pipe 28 being measured, the relative positions of the bit 27 in relation to the placement surface 67 and the workpiece surface 74 can be indirectly measured.

In this instance, when a new mechanism is added for measuring the relative positions of the bit 27 in relation to the placement surface 67 and the workpiece surface 74, the structure may become complicated. In addition, the new mechanism may interfere with acquisition and fastening of the screw 14. Therefore, in the instance of an air-suction type screw fastening device 10, the relative position of the bit 27 in relation to the suction pipe 28 is measured using the pre-existing suction pipe 28. As a result, the relative positions of the bit 27 in relation to the placement surface 67 and the workpiece surface 74 are indirectly measured. Therefore, the position of the bit 74 can be measured without the structure becoming complicated and without interference to the acquisition and fastening of the screw 14.

The screw fastening device 10 judges whether or not screw loosening has occurred by measuring the relative position of the bit 27 in relation to the placement surface 67 and the relative position of the bit 27 in relation to the workpiece surface 74. Here, in the instance of a device having a conventional configuration in which screw loosening is judged, for example, by using the dimension of the bit 27 as a reference value, when engagement between the bit 27 and the screw 14 is repeated and the tip of the bit 27 becomes worn, the reference value itself may become inaccurate. On the other hand, the screw fastening device 10 measures the first bit position serving as the reference value at screw acquisition and then measures the second bit position as a comparison value at screw fastening completion following immediately thereafter. In addition, excessive wear of the bit 27 cannot be considered to occur during the brief period between the measurement of the first bit position and the measurement of the second bit position. Therefore, even in an instance in which the bit 27 becomes worn over a long period by repeated fastening of the screw 14, the reference value does not become inaccurate. Thus, screw loosening can be correctly judged. This similarly applies to an instance in which the suction pipe 28 repeatedly comes into contact with the placement surface 67 or the workpiece surface 74 and becomes worn. In other words, even when the bit 27 or the suction pipe 28 becomes worn, the screw fastening device 10 is capable of accurately judging screw loosening without requiring an operation of some kind that depends on the state of wear.

The screw loosening judging method according to the present embodiment is achieved with focus placed on the state in which the screw 14 is seated occurring at screw acquisition and at screw fastening completion, in the series of processes for acquiring the screw 14 from the screw supplying device 13 and fastening the screw 14 onto the workpiece 15. In other words, judgment is made that screw loosening has not occurred when the state in which the screw 14 is seated at screw acquisition is replicated within an allowable range at screw fastening completion. Judgment is made that screw loosening has occurred when the state in which the screw 14 is seated is not replicated. As a result, the reference value for judging screw loosening is not limited by the allowable error of the screw 14, the individual differences of the workpieces 15, and the like. The rate of correct judgment in judgment of screw loosening can be improved. In addition, work load and operation time required for judgment of screw loosening can be reduced.

(Other Embodiments)

The present invention is not limited to the above-described embodiment. Modifications or expansions can be made as follows.

According to the embodiment, the distance to the flange section 41 is measured by the probe 40 that is in physical contact with the flange section 41. However, a configuration is possible in which the distance to the flange section 41 is measured without contact by an optical sensor, such as a so-called laser displacement meter. In addition, the shape and the attachment position of the flange section 41 are not limited to those given according to the embodiment. Furthermore, a configuration is possible in which the flange section 41 is not provided. In this instance, the distance to the placement surface 67 or the workpiece surface 74 is directly measured. In other words, the bit position measuring section 29 of the present invention can have any configuration as long as it is capable of directly or indirectly measuring or estimating the relative position of the bit 27 in relation to the placement surface 67 and the workpiece surface 74.

According to the embodiment, the screw 14 is held by so-called air-suction. However, other configurations are possible, such as magnetic attachment in which the screw 14 is held by a magnetic means, or a mechanical attachment in which the screw 14 is gripped. In this instance, the position of the bit 27 is merely required to be measured using a gauge head. The gauge head is provided for identifying the positional relationship with the placement surface 67 or the workpiece surface 74 when the screw 14 is acquired or fastened. The gauge head comes into contact with the placement surface 67 at screw acquisition. In addition, the gauge head comes into contact with the workpiece surface 74 at screw fastening completion. Therefore, as a result of the relative position between the gauge head and the bit 27 being measured, the relative position of the bit 27 in relation to the placement surface 67 and the workpiece surface 74 can be measured without the structure becoming complicated or interference to the acquisition and fastening of the screw 14.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A screw fastening device comprising:
a bit that is engageable with a screw, wherein the screw is acquirable from a screw supplying device and the acquired screw is screwable onto a workpiece, the screw having an axial direction, the workpiece having a workpiece surface;
a bit driving section configured to hold the bit and drive the held bit such that the bit engages with the screw and the screw is rotated to advance or return in the axial direction, the screw supplying device having a placement surface;
a first driving section configured to drive the bit driving section so as to produce a screw acquisition state provided when the screw is acquired from the screw supplying device, the bit being engaged with the screw and pressing the screw onto the placement surface of the screw supplying device for acquisition of the screw in the screw acquisition state;
a first bit position measuring section configured to measure, as a first bit position, a position of the bit which is relative to the placement surface of the screw supplying device in the screw acquisition state;
a second bit driving section configured to drive the bit driving section so as to produce a screw fastening completion state provided when the fastening of the screw into a hole of the workpiece has been completed by the bit driven by the bit driving section, the bit being still engaged with the screw in the screw fastening completion state;
a second bit position measuring section configured to measure, as a second bit position, a position of the bit which is relative to the workpiece surface of the workpiece in the screw fastening completion state; and
a screw loosening judging section configured to judge whether or not loosening of the screw has occurred in the screw fastening completion state, based on a comparison between a difference between the first bit position and the second bit position and an allowable range set in advance for the difference.

2. The screw fastening device of claim 1, further comprising a storage section that temporarily stores therein information indicative of the first bit position until the second bit position is measured by the second bit position measuring section.

3. The screw fastening device of claim 2, wherein the bit driving section is provide with a suction pipe arranged relatively movable to the bit in the axial direction, the suction pipe having an end surface touchable to the placement surface in the screw acquisition state, and touchable to the workpiece surface in the screw fastening completion state,
wherein the first bit position measuring section and the second bit position measuring section are configured to measure the first bit position and the second bit position, respectively, as positional amounts of the bit which are relatively changed to the suction pipe in the axial direction.

4. The screw fastening device of claim 3,
wherein the suction pipe suctions the screw when the screw is acquired from the screw supplying device; and
the suction pipe is arranged to accommodate therethrough the bit such that the suction pipe is movable relatively to the bit, and is provided with the end surface having an opening through which the screw is suctioned, wherein the end surface is touched to both the placement surface in the screw acquisition state and the workpiece surface in the screw fastening completion state.

5. The screw fastening device of claim 3, further comprising notifying means for providing a notification of an occurrence of the loosening of the screw when the screw loosening judging section judges that the loosening of the screw has occurred.

6. The screw fastening device of claim 2, wherein the bit driving section is provided with a suction pipe arranged relatively movable to the bit in the axial direction, the suction pipe accommodating therein the bit,
wherein the first bit position measuring section and the second bit position measuring section are provided with sensing means for sensing a relative position between the suction pipe and the bit in the axial direction when the screw acquisition state and the screw fastening completion state are realized.

7. The screw fastening device of claim 6, further comprising a holder that holds the bit such that the bit is movable in the axial direction,
wherein the sensing means comprises
a flange fixedly secured to an outer surface of the suction pipe,
a sensor that outputs an electric signal corresponding to both the first bit position and the second bit position, the sensor being fixedly secured to an outer surface of the holder, and
a probe having two ends, a first one of the two ends being fixedly secured to the flange and a second one of the two ends providing the sensor with positional changes of the suction pipe in the axial direction.

8. The screw fastening device of claim 7, wherein the suction pipe suctions the screw when the screw is acquired from the screw supplying device, the suction pipe being configured to be used for both suctioning the screw and measuring the first bit position and the second bit position.

9. The screw fastening device of claim 6, wherein the suction pipe suctions pipe the screw when the screw is acquired from the screw supplying device, the suction pipe being configured to be used for both suctioning the screw and measuring the first bit position and the second bit position.

10. The screw fastening device of claim 1, further comprising notifying means for providing a notification of an occurrence of the loosening of the screw when the screw loosening judging section judges that the loosening of the screw has occurred.

11. The screw fastening device of claim 1, wherein the screw loosening judging section is configured to (i) calculate the difference, (ii) compare the calculated difference with the allowable range to determine whether or not the calculated difference is outside the allowable range, and (iii) determine that the loosening of the screw has occurred when the comparison shows that the calculated difference is outside the allowable range.

12. The screw fastening device of claim 11, further comprising notifying means for providing a notification of an occurrence of the loosening of the screw when the screw loosening judging section judges that the loosening of the screw has occurred.

* * * * *